(No Model.)
T. SCHWARZ.
ROOFING TONGS.
No. 288,498. Patented Nov. 13, 1883.
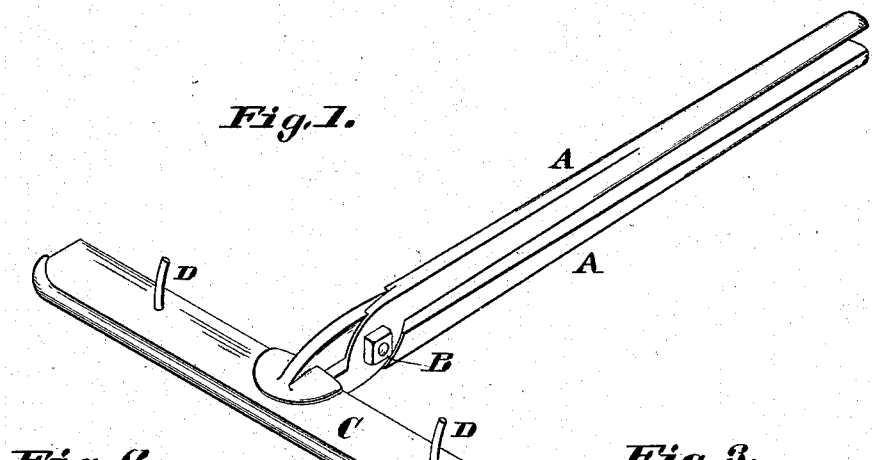
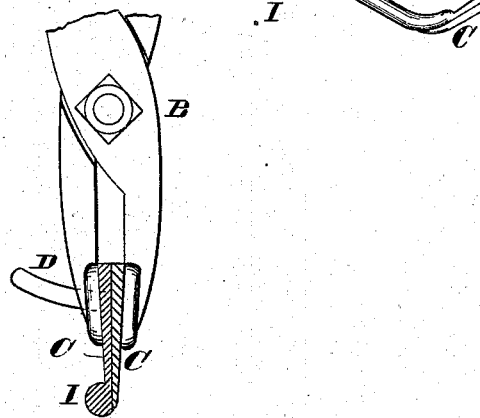
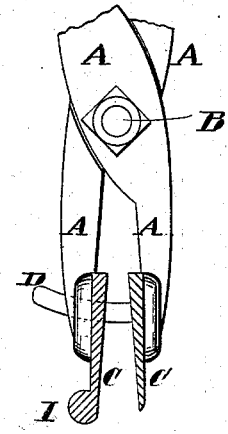
Attest:
Charles Pickles
Geo. L. Wheelock
Inventor:
Theodore Schwarz
By Knight Bros
Attys.

UNITED STATES PATENT OFFICE.

THEODORE SCHWARZ, OF SEDALIA, MISSOURI.

ROOFING-TONGS.

SPECIFICATION forming part of Letters Patent No. 288,498, dated November 13, 1883.

Application filed September 8, 1883. (No model.)

*To all whom it may concern:*

Be it known that I, THEODORE SCHWARZ, of Sedalia, in the county of Pettis and State of Missouri, have invented a certain new and useful Improvement in Roofing-Tongs, of which the following is a full, clear, and exact description, reference being had to the accompanying drawings, forming part of this specification, in which—

Figure 1 is a perspective view. Fig. 2 is a detail section, showing the tongs closed; and Fig. 3 is a similar view, showing the tongs open.

My invention relates to tongs for bending tin in roofing houses, &c.; and my invention consists in a pair of handles pivoted together, and having plates secured to or formed upon their lower or working ends, one of the plates being provided with a flange or bead on its lower edge, presenting a rounded surface extending from the gripping portion downward and outward, which causes the tongs to make round bends in the tin, instead of sharp square bends, as more fully described hereinafter.

Referring to the drawings, A represents the handles of the tongs pivoted together at B.

C represents plates secured to or formed upon the ends of the handles, the ends near the pivot-point.

D represents gage-pins secured to one of the plates C, and passing through holes or perforations in the other. These pins are common on this class of tongs, their office being to cause the tongs to take hold of a uniform amount of tin each time, so that the bend will be even.

Formed upon or secured to the outer edge of one of the plates C is a bead or flange, I, which, having a rounded surface extending from the gripping portion downward and outward, and being on the side toward which the tin is bent, causes the tin to have a round bend formed in it instead of square sharp bend, as would be the case in the absence of the bead. There are two leading advantages arising from the use of this bead—viz., the tin is much less liable to be cracked or broken while being bent, and second, it is much easier for the operator to do the work.

I claim as my invention—

The combination of the handles pivoted together, and the plates secured to or formed upon the handles, and one of them having a bead or flange formed upon or secured to its outer edge, having a rounded surface extending from its gripping portion downward and outward, substantially as shown and described for the purpose set forth.

THEODORE SCHWARZ.

In presence of—
 JAS. T. MONTGOMERY,
 B. G. WILKERSON,
 AUGUST JACOBSEN.